United States Patent Office 3,767,597
Patented Oct. 23, 1973

3,767,597
HIGH TEMPERATURE THERMISTOR COMPOSITION
Takeshi Masuyama, Takatsuki, Michio Matsuoka, Hirakata, Yoshio Iida, Suita, and Mikio Matsuura, Neyagawa, Japan, assignors to Matsushita Electric Industrial Co., Ltd., Osaka, Japan
Filed July 6, 1971, Ser. No. 159,833
Claims priority, application Japan, July 15, 1970, 45/62,369, 45/62,370, 45/62,372
Int. Cl. H01b 1/08; H01c 7/04
U.S. Cl. 252—518                                    5 Claims

ABSTRACT OF THE DISCLOSURE

A composition for a high temperature thermistor consists essentially of 50.000 to 99.995 mole percent zinc oxide and one oxide selected from the group consisting of lead oxide, antimony oxide and barium oxide.

---

This invention relates to a composition for a high temperature thermistor, and more particularly to a composition including, as a major ingredient, zinc oxide.

A thermistor is a resistor whose electrical resistance decreases with an increase in temperature and is used for temperature measurement usually in a range of from room temperature to about 200° C. Such kind of thermistor is of a composition including nickel oxide, cobalt oxide, manganese oxide, iron oxide and/or chromium oxide. The temperature dependence of electrical resistance of thermistor is expressed by the following equation:

$$R_1 = R_2 \exp\left(\frac{B}{T_1} - \frac{B}{T_2}\right)$$

where $R_1$ is electrical resistance at $T_1$ ° K., $R_2$ is electrical resistance at $T_2$ ° K. and B is a constant which is named a B-value. The higher B-value results in higher variation in the electrical resistance with temperature. Conventional thermistors are primarily directed for use in a temperature range of from room temperature to about 200° C. and do not have sufficiently high temperature coefficients of electrical resistivity at a high temperature. Recent progress in controlling equipment has required a thermistor which can be operable at a higher temperature range such as, for example, 100° to 300° C., 200° to 500° C., and 300° to 600° C. and so on.

Therefore, an object of the present invention is to provide a composition for use in a high temperature thermistor.

This and other objects of the present invention will be apparent from the following detailed description taken together with accompanying drawings wherein.

Figure 1:
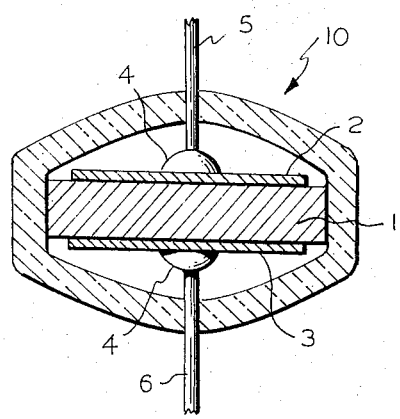
FIG. 1 is a cross sectional view of high temperature thermistor of the disc type according to the present invention.

Before proceeding with a detailed description of the composition for high temperature thermistors contemplated by the present invention, their construction will be described with reference to FIG. 1, wherein reference charactor 10 designates, as a whole, a high temperature thermistor having a sintered body 1 having a composition according to the present invention. The sintered body 1 is prepared in a manner hereinafter set forth and is provided with a pair of electrodes 2 and 3. Wire leads 5 and 6 are attached conductively to the electrodes 2 and 3, respectively, by a connection means 4 such as solder or the like.

Figure 2:
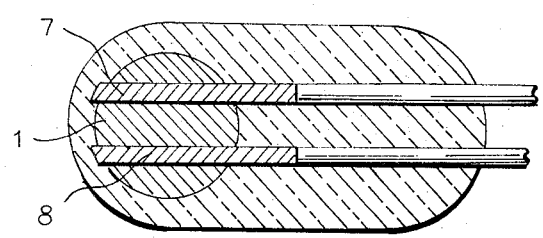
FIG. 2 is a cross sectional view of high temperature thermistor of the bead type according to the present invention.

Another embodiment of a high temperature thermistor according to the present invention is illustrated in FIG. 2 wherein similar reference characters designate components similar to those of FIG. 1. A sintered body 1 has two lead wires 7 and 8 inserted firmly therein. The insertion of two lead wires 7 and 8 can be achieved by a technique well known in the thermistor manufacturing art. If necessary, the sintered body 1 may be sealed in a glass tubing by any suitable and available method.

It has been discovered according to the present invention that a high temperature thermistor having a high temperature coefficient of electrical resistance is achieved by using a sintered body of a composition consisting essentially of, as a first ingredient, zinc oxide (ZnO) and not less than 0.005 mole percent of, as a second ingredient, antimony oxide ($Sb_2O_3$), lead oxide (PbO) or barium oxide (BaO). Although a sintered body of pure zinc oxide has a low electrical resistivity and a low temperature coefficient of electrical resistance, the incorporation of at least 0.005 mole percent of said second ingredient increases the electrical resistivity and temperature coefficient. The upper limit of the amount of the second ingredient is not more than 50 mole percent. The use of more than 50 mole percent of the second ingredient has the disadvantage that the sintered body is unstable with humidity, carbon dioxide in air, and heat cycle for measurement of temperature.

A composition for a high temperature thermistor according to the present invention consists essentially of 50.000 to 99.995 mole percent of zinc oxide and 0.005 to 50.000 mole percent of one oxide selected from the group consisting of lead oxide, antimony oxide and barium oxide.

The amount of the second ingredient is controlled with the operation temperature range. The higher amount of the second ingredient makes the electrical resistivity higher.

The sintered body 1 can be prepared by a per se well known ceramic technique. Sintering materials having the compositions according to the invention are mixed well in a wet or dry mill so as to produce homogeneous mixtures. The mixtures are dried and pressed in a mold into desired shapes at a pressure of from 100 kg./cm.² to 1,000 kg./cm.². The pressed bodies are sintered in air at 1000 to 1400° C. for 1 to 3 hours and then furnace cooled to room temperature (from about 15° to about 30° C.).

The starting materials are realized by those which are converted into oxide when heated at the sintering temperature, for example, carbonate and hydroxide.

A high temperature thermistor in a bead form can be prepared by using a slurry of a given composition according to the invention. The slurry includes preferably a binding material such as polyvinyl alcohol and is formed into bead. Two lead wires of inert metal such as platinum are inserted into the bead. The bead with two lead wires is dried and sintered in a manner similar to that mentioned above. After sintering, the two lead wires are inserted firmly into the sintered bead and are in an electrically conductive contact with the sintered bead.

The following examples are given as illustrative of the presently preferred embodiments according to the present invention; however, it is not intended that the scope of the invention be limited to the specific examples.

EXAMPLE 1

Mixtures of zinc oxide and antimony oxide in the compositions listed in Table 1 were thoroughly mixed in a wet mill for 5 hours.

TABLE 1

| Sample No. | Mole percent | |
|---|---|---|
| | ZnO | $Sb_2O_3$ |
| 1 | 99.99 | 0.01 |
| 2 | 95.00 | 5.00 |
| 3 | 51.00 | 49.00 |

The mixtures were dried and pressed in molds into discs of 10 mm. diameter and 2 mm. thick at a pressure of 500 kg./cm.² The discs were heated in air at 1350° C. for 1 hour and furnace cooled to room temperature. The heated discs were 8 mm. in diameter and 1.5 mm. thick.

Figure 3:
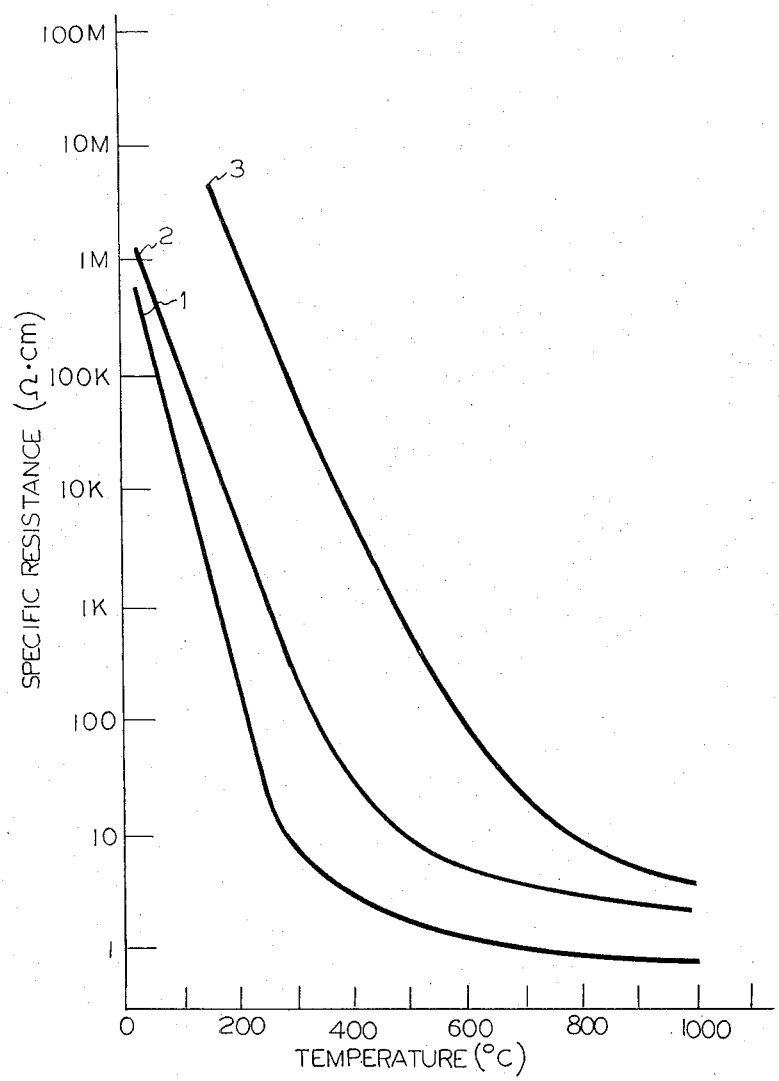
FIG. 3 is a graph showing the temperature dependence of electrical resistivity of a high temperature thermistor of a composition including zinc oxide and antimony oxide in accordance with the present invention.

The heated discs were provided with silver paint electrodes at both opposite surfaces by firing available and suitable silver paint at 800° C. Two Pt lead wires were attached to the silver paint electrodes by using the same silver paint as connecting means. The resultant discs have a temperature dependence of electrical resistivity as shown in FIG. 3 wherein reference characters designate corresponding compositions listed in Table 1.

EXAMPLE 2

High temperature thermistors of compositions listed in Table 2 were prepared in a manner similar to that of Example 1.

TABLE 2

| Sample No. | Mole percent | |
|---|---|---|
| | ZnO | PbO |
| 4 | 99.99 | 0.01 |
| 5 | 80.00 | 20.00 |
| 6 | 51.00 | 49.00 |

Figure 4:
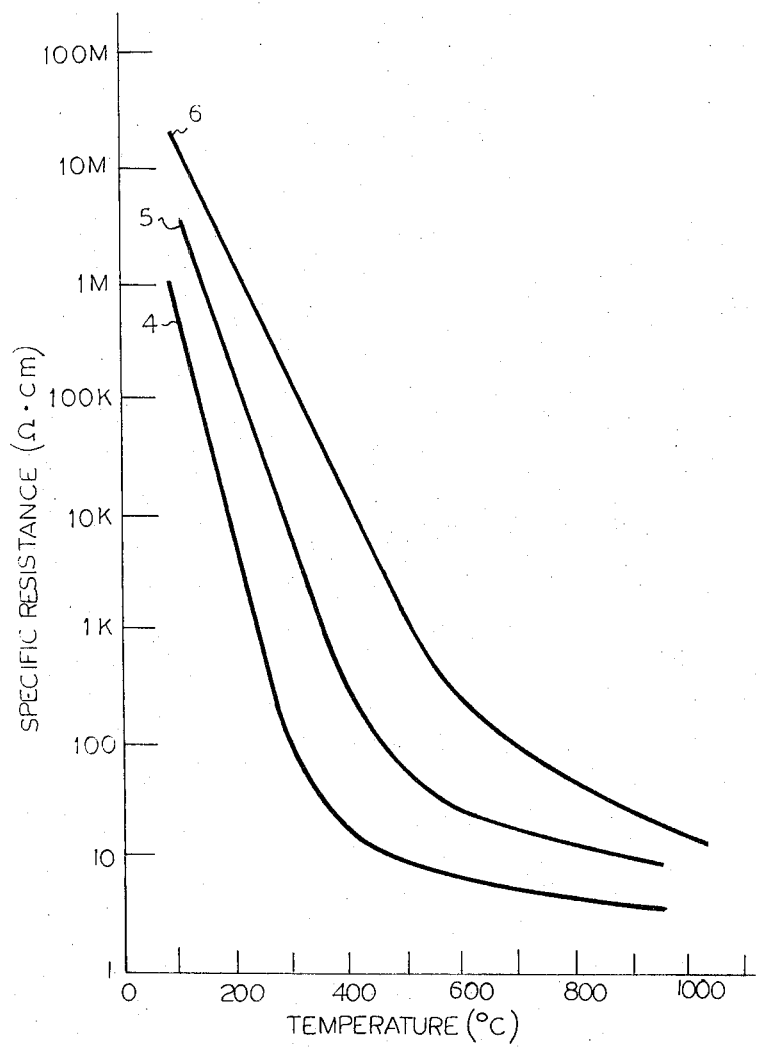
FIG. 4 is a graph showing the temperature dependence of electrical resistivity of a high temperature thermistor of a composition including zinc oxide and lead oxide in accordance with the present invention.

The resultant high temperature thermistors have a temperature dependence of electrical resistivity as shown in FIG. 4 wherein reference characters designate the corresponding compositions.

EXAMPLE 3

High temperature thermistors of compositions listed in Table 3 were prepared in a manner similar to that of Example 1.

TABLE 3

| Sample No. | Mole percent | |
|---|---|---|
| | ZnO | BaO |
| 7 | 99.99 | 0.01 |
| 8 | 95.00 | 5.00 |
| 9 | 51.00 | 49.00 |

Figure 5:
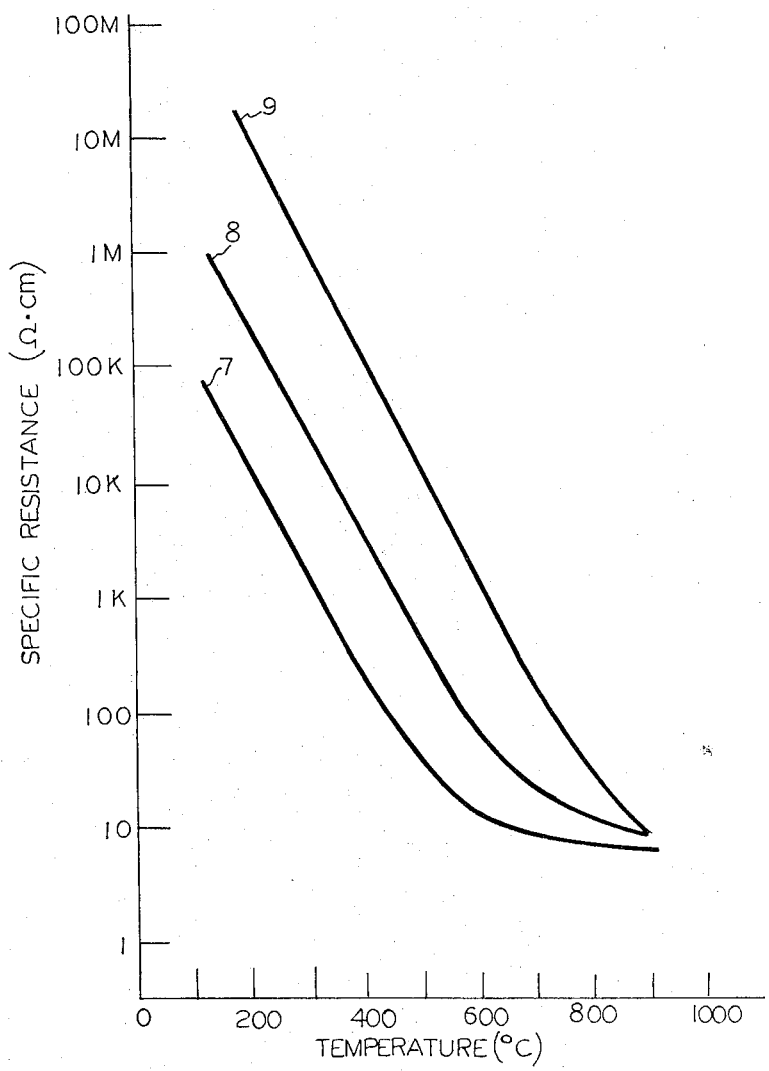
FIG. 5 is a graph showing the temperature dependence of electrical resistivity of a high temperature thermistor of a composition including zinc oxide and barium oxide in accordance with the present invention.

The resultant high temperature thermistors have a temperature dependence of electrical resistivity as shown in FIG. 5 wherein reference characters designate the corresponding compositions.

What is claimed is:

1. A composition for a high temperature thermistor consisting essentially of 50.000 to 99.995 mole percent of zinc oxide and 0.005 to 50.000 mole percent of antimony oxide.

2. A composition for a high temperature thermistor consisting essentially of 50.000 to below 90.000 mole percent of zinc oxide and above 10.000 to 50.000 mole percent of one oxide selected from the group consisting of lead oxide, antimony oxide and barium oxide.

3. A composition for a high temperature thermistor as claimed in claim 2, wherein said one oxide is lead oxide.

4. A composition for a high temperature thermistor as claimed in claim 2, wherein said one oxide is antimony oxide.

5. A composition for a high temperature thermistor as claimed in claim 2 wherein said one oxide is barium oxide.

References Cited

UNITED STATES PATENTS

| | | | |
|---|---|---|---|
| 3,632,528 | 1/1972 | Matsuoka et al. | 252—518 |
| 3,634,337 | 1/1972 | Matsuoka et al. | 252—518 X |
| 2,857,294 | 10/1958 | Davis | 252—518 X |
| 2,892,988 | 6/1959 | Schusterius | 252—520 X |
| 3,496,512 | 2/1970 | Matsuoka et al. | 338—22 R |
| 3,515,686 | 6/1970 | Bowman | 252—518 X |
| 3,671,319 | 6/1972 | Arrance | 252—518 X |
| 3,008,825 | 11/1961 | Van Dorn et al. | 96—1.8 |

CHARLES E. VAN HORN, Primary Examiner

U.S. Cl. X.R.

338—22